(12) United States Patent
Vempati

(10) Patent No.: US 8,451,760 B2
(45) Date of Patent: May 28, 2013

(54) POWER SAVINGS IN ACCESS POINTS

(75) Inventor: Ramprasad Vempati, Karnataka (IN)

(73) Assignee: Aruba Networks, Inc., Sunnyvale, CA (US)

( * ) Notice: Subject to any disclaimer, the term of this patent is extended or adjusted under 35 U.S.C. 154(b) by 259 days.

(21) Appl. No.: 12/847,895

(22) Filed: Jul. 30, 2010

(65) Prior Publication Data

US 2012/0026925 A1 Feb. 2, 2012

(51) Int. Cl.
*G08C 17/00* (2006.01)

(52) U.S. Cl.
USPC .......................................................... 370/311

(58) Field of Classification Search
USPC ......... 370/217–220, 225, 228, 311, 437–438, 370/465
See application file for complete search history.

(56) References Cited

U.S. PATENT DOCUMENTS

| | | | | |
|---|---|---|---|---|
| 7,742,498 | B2* | 6/2010 | Barzegar et al. | 370/465 |
| 8,223,794 | B2* | 7/2012 | Barzegar et al. | 370/465 |
| 2003/0048770 | A1* | 3/2003 | Proctor, Jr. | 370/349 |
| 2006/0045125 | A1* | 3/2006 | Kim | 370/465 |
| 2006/0268928 | A1* | 11/2006 | Barzegar et al. | 370/465 |
| 2008/0227403 | A1* | 9/2008 | Taki | 455/68 |
| 2008/0279162 | A1* | 11/2008 | Desai | 370/338 |
| 2009/0258672 | A1* | 10/2009 | Camp et al. | 455/553.1 |
| 2010/0061334 | A1* | 3/2010 | Gault et al. | 370/330 |
| 2010/0195549 | A1* | 8/2010 | Aragon et al. | 370/311 |

* cited by examiner

*Primary Examiner* — Kevin Mew
(74) *Attorney, Agent, or Firm* — Blakely, Sokoloff, Taylor & Zafman LLP

(57) ABSTRACT

Embodiments of the invention are directed to power savings in Access Points (APs). Legacy 802.11 modes such as 802.11a/b/g use one transmitter/receive chain per radio. High Throughput (HT) 802.11n modes use multiple (2, 3, or more) transmit/receive chains per radio. Power consumed by the AP may be reduced by powering off unused transmit and/or receive chains. Multiple transmit chains are only powered up when HT 802.11n transmissions requiring them are made. Using protected mode signaling, the AP powers up multiple receive chains needed for HT 802.11n reception on receiving a Request to Send (RTS) packet indicating that an 802.11n client wishes to send 802.11n HT data. Transmit and/or receive chains may be powered up with minimum on times. Only certain elements of a chain may be powered up and down, with those elements requiring a great deal of settling time left powered on. Transmit chains may be powered up on the reception of RTS-based information indicating arrival of HT 802.11 data.

41 Claims, 1 Drawing Sheet

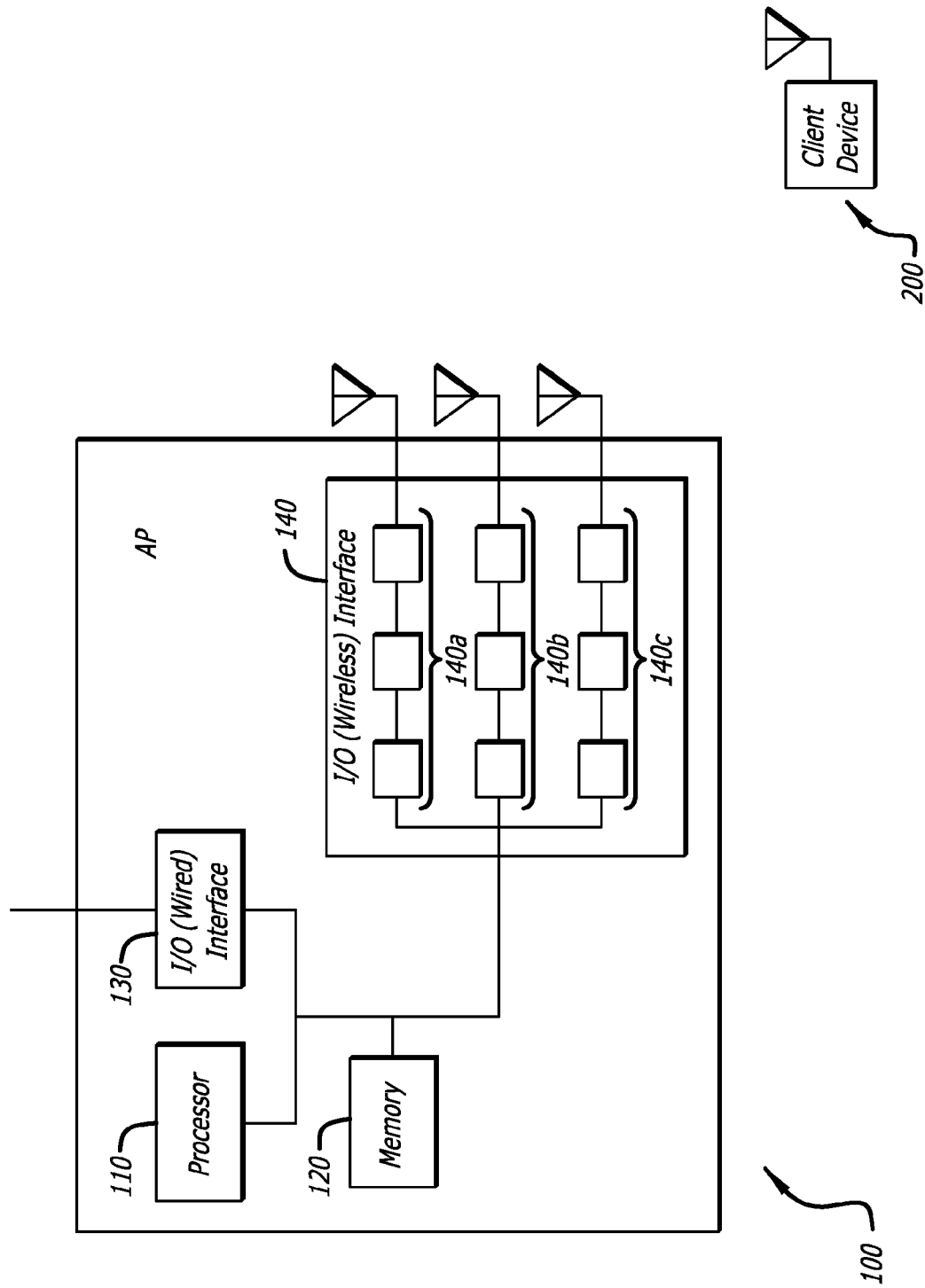

POWER SAVINGS IN ACCESS POINTS

BACKGROUND OF THE INVENTION

The present invention relates to wireless digital networks, and in particular, to power saving in wireless access points.

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks.

Access points operating in accordance with IEEE 802.11 standards support clients operating in different modes; these modes use different bandwidths, modulation techniques, and numbers of radio streams, ranging from a single radio transmitter/receiver designed to handle only 11 Mbit/sec 802.11b, to 3×3 802.11n systems using three transmit and receive streams to transfer data at speeds up to 300 Mbit/sec. The amount of power consumed by the radio portion of an access point designed for legacy (802.11a/b/g use) is substantially less than that used by a High Throughput (HT) 802.11n radio subsystem.

Legacy radios, those for 802.11a/b/g use only one radio transmitter/receiver. HT 802.11n radios use multiple radio transmitter/receiver/antenna subsystems, 2, 3, or even 4 transmit/receive subsystems per frequency band.

What is needed is a way of automatically reducing power in modern, 802.11n APs when operating in Legacy modes.

BRIEF DESCRIPTION OF THE DRAWINGS

The invention may be best understood by referring to the following description and accompanying drawings that are used to illustrate embodiments of the invention in which:

FIG. 1 shows clients in a wireless network.

DETAILED DESCRIPTION

Embodiments of the invention relate to methods of managing power consumption in an Access Point having multiple transmit/receive chains such as those required for 802.11n operation. When the AP is servicing 802.11n clients, multiple RX/TX chains are active. When operating in Legacy modes, such 802.11a/b/g, only one radio chain is active and the other radio chains are powered off. All radio chains are used in high throughput (HT) 802.11n mode. When an AP supports mixed modes, with 802.11a/b/g and n clients active on the same channel, the AP uses 802.11 protected mode, which was introduced with 802.11g and refined with 802.11n. In protected mode, higher data rate frames, such as 802.11g and 802.11n frames are prefaced by a RTS-CTS exchange that is receivable by legacy (802.11b) systems.

According to the present invention, when a radio subsystem is idle, only one receive (RX) chain is powered up. When an 802.11n frame needs to be transmitted, all required transmit chains are powered up. When the AP receives a RTS packet from an 802.11n station requesting permission to transmit 802.11n HT frames, all receive chains are powered up.

The turn on and turn off times for radio chains may be adjusted according to the time required for a particular chain to become operational once power is applied. Depending on the circuitry, this may be a period of microseconds to milliseconds. Alternatively, higher-power elements such as transmit power amplifiers may be subject to power savings according to the invention, while lower power elements of the radio chain, or those elements requiring longer times to power up are left powered.

FIG. 1 shows a network in which access points (APs) 100 are purpose-made digital devices, each containing a processor 110, memory hierarchy 120, and input-output interfaces 130, 140. In one embodiment of the invention, a MIPS-class processor such as those from Cavium or RMI is used. Other suitable processors, such as those from Intel or AMD may also be used. The memory hierarchy 120 traditionally comprises fast read/write memory for holding processor data and instructions while operating, and nonvolatile memory such as EEPROM and/or Flash for storing files and system startup information. Wired interfaces 130 are typically IEEE 802.3 Ethernet interfaces, used for wired connections to other network devices such as switches, or to a controller. Wireless interfaces 140 may be WiMAX, 3G, 4G, and/or IEEE 802.11 wireless interfaces. In one embodiment of the invention, APs operate under control of a LINUX operating system, with purpose-built programs providing host controller and access point functionality.

For supporting 802.11 modes such as 802.11a, b, g, one radio transmitter and one radio receiver coupled to one antenna are needed per band. For purposes of the invention, the combination of a transmitter, receiver, and antenna are known as a radio chain, shown as 140a of FIG. 1 For 802.11n support of high throughput (HT) modes, multiple transmit/receive chains, 2, 3, or more, are required per band, shown as 140b, 140c.

Similarly with client devices 200, 802.11a, b, g communications use one transmitter/receiver per band, while 802.11n HT communications require multiple transmitter/receiver chains.

As is known to the art, an access point may serve wireless clients operating in different modes. Particularly in the 2.4 GHz band, an access point may support client devices using 802.11b, 802.11g, and 802.11n communications on the same channel.

The present invention recognizes that multiple transmit/receive chains per band are only needed during communications with HT 802.11n clients; at other times all but one of these transmit/receive chains may be powered down.

When the AP is idle, all transmit chains may be shut down. All but one receive chain, such as 140a, (or one receive chain per band) may be shut down.

According to the present invention, when frames are transmitted, the required number of transmit chains are powered up. 802.11a, b, and g communications only require one transmit chain. HT 802.11n communications require multiple transmit chains.

When the AP receives an RTS packet from an 802.11n station, indicating that the station wishes to begin an HT multi-chain transmission, the AP powers up the required multiple receive chains, such as 140a, 140b, 140c.

While in one embodiment, multiple receive chains are only powered off leaving one operating receive chain when the AP has been idle on that band for a predetermined period of time, in an additional embodiment, the additional receive chains may be powered down if no RTS packets and accompanying HT 802.11n frames have been received in a predetermined period.

According to the present invention, the circuit elements that are powered off and on are determined by circuit topology and by operational constraints. While transmitter power amplifiers and receiver preamplifiers may be powered off and on easily and quickly, other circuitry, such as synthesizers and phase locked loops for determining operating frequencies may require microseconds to tens of milliseconds to power up and stabilize. It may be useful, then, to leave circuit elements such as these frequency determining elements powered on, except when the AP is placed in a deep sleep or standby mode.

Alternatively, these circuit elements may be switched on and off with time constraints imposed. For example, minimum power on times of 200 to 400 milliseconds could be imposed. Subsequent HT activity extends the power on time.

In an additional embodiment of the invention, when a RTS packet indicating the use of HT 802.11n is received at the AP, the process of powering up the additional transmit chains may be initiated, as it is reasonable to assume that a client sending HT 11n traffic will most likely have HT 11n traffic sent to it in reply.

In an additional embodiment of the invention, power on and power off times for the various receiver and transmitter elements may be accumulated. This data may be used to calculate power savings.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A method comprising:
    operating, by an access point, in a first operating mode, wherein one transmit/receive chain of a plurality of transmit/receive chains is activated when the access point is in the first operating mode, each of the plurality of transmit/receive chains comprises a receiver and a transmitter associated with a particular frequency band;
    analyzing wireless information received by the access point to determine whether incoming wireless information is from a first wireless client supporting a first communication scheme or a second wireless client supporting a second communication scheme;
    maintaining activation of the one transmit/receive chain if the incoming wireless information is from the first wireless client;
    activating multiple transmit/receive chains of the plurality of transmit/receive chains for transmitting or receiving information when the access point is placed in a second operating mode upon determining that the incoming wireless information is from the second wireless client; and
    activating only one transmit/receive chain and deactivating one or more transmit/receive chains of the multiple transmit/receive chains in response to the access point returning to the first operating mode.

2. The method of claim 1 wherein the transition of the access point from the first operating mode to the second operating mode is made upon receiving a predetermined packet.

3. The method of claim 2 wherein the predetermined packet is a Request to Send (RTS) packet indicating transmission of data in accordance with a particular IEEE 802.11 standard.

4. The method of claim 1 wherein the transition of the access point from the first operating mode to the second operating mode is made to transmit data in the second operating mode.

5. The method of claim 1 wherein the activating of the only one transmit/receive chain and the deactivating of the one or more transmit/receive chains comprises controlling power to portions of the plurality of transmit/receive chains.

6. The method of claim 5 wherein the portions of the plurality of transmit/receive chains to which power is controlled include power amplifiers.

7. The method of claim 1 further comprising:
    starting a timer for a predetermined period when the access point transitions from the first operating mode to the second operating mode;
    extending the timer by a predetermined period for each transmit or receive operation performed in the second operating mode; and
    activating the only one transmit/receive chain and deactivating the one or more transmit/receive chains of the multiple transmit/receive chains in response to the access point returning to the first operating mode and the timer expires.

8. The method of claim 1, wherein the first operating mode transmits and receives data according to at least IEEE 802.11b and 802.11g standards, and the second operating mode transmits and receives data according to at least IEEE 802.11n.

9. The method of claim 7, wherein the extending the timer comprises restarting the timer in response to each transmit or receive operation performed in the second operating mode.

10. The method of claim 1, wherein the multiple transmit/receive chains include the one transmit/receive chain so that deactivating of the one or more transmit/receive chains includes deactivating at least one transmit/receive chain other than the one transmit/receive chain.

11. A method of operating a wireless access point for use with a wireless digital network, where the access point having a plurality of transmit/receive chains, the method comprising:
    operating, by an access point, in a first operating mode, wherein one transmit/receive chain of a plurality of transmit/receive chains is activated when the access point is in the first operating mode;
    activating multiple transmit/receive chains of the plurality of transmit/receive chains for transmitting or receiving information when the access point is placed in a second operating mode;
    starting a timer for a first predetermined period when the access point transitions from the first operating mode to the second operating mode;

restarting the timer by a second predetermined period for each transmit or receive operation performed when the access point is in the second operating mode; and activating only one transmit/receive chain and deactivating one or more transmit/receive chains of the multiple transmit/receive chains in response to the access point returning to the first operating mode and the timer has expired.

12. The method of claim 11 wherein the transition of the access point from the first operating mode to the second operating mode is made upon receiving a predetermined packet.

13. The method of claim 12 wherein the predetermined packet is a Request to Send (RTS) packet indicating transmission of data in accordance with a particular IEEE 802.11 standard.

14. The method of claim 11 wherein the transition of the access point from the first operating mode to the second operating mode is made to transmit data in the second operating mode.

15. The method of claim 11 wherein the activating and deactivating of transmit/receive chains includes controlling power to portions of the plurality of transmit/receive chains.

16. The method of claim 15 wherein the portions of the plurality of transmit/receive chains to which power is controlled include power amplifiers.

17. The method of claim 11, wherein the one transmit/receive chain of the plurality of transmit/receive chains activated upon returning the access point from the second operating mode to the first operating mode is different from the multiple transmit/receive chains.

18. The method of claim 11, wherein the one transmit/receive chain of the plurality of transmit/receive chains activated upon returning the access point from the second operating mode to the first operating mode is part of the multiple transmit/receive chains.

19. The method of claim 11, wherein the deactivating of one or more transmit/receive chains of the at least two of the multiple transmit/receive chains comprises removing power from at least one of an amplifier and a pre-amplifier implemented within the one or more transmit/receive chains.

20. The method of claim 11, wherein the deactivating of the one or more transmit/receive chains of the multiple transmit/receive chains comprises removing power from selected circuitry within the one or more transmit/receive chains while maintaining power to circuitry for determining operating frequencies within the one or more transmit/receive chains.

21. The method of claim 20, wherein the circuitry for determining operating frequencies includes at least one of a synthesizer and a phase locked loop.

22. The method of claim 21, wherein the selected circuitry includes at least one of a power amplifier and a preamplifier.

23. The method of claim 11, wherein each of the plurality of transmit/receive chains includes radio transmitter and receiver circuitry.

24. A non-transitory computer readable medium that includes a computer program that, when executed by a processor within an access point, performs operations comprising:

operating in a first operating mode, wherein one transmit/receive chain of a plurality of transmit/receive chains is activated when the access point is in the first operating mode, each of the plurality of transmit/receive chains comprises a receiver and a transmitter associated with a particular frequency band;

analyzing incoming wireless information to determine whether the incoming wireless information is from a first wireless client supporting a first communication scheme or a second wireless client supporting a second communication scheme;

maintaining activation of the one transmit/receive chain if the incoming wireless information is from the first wireless client;

activating multiple transmit/receive chains of the plurality of transmit/receive chains for transmitting or receiving information when the access point is placed in a second operating mode upon determining that the incoming wireless information is from the second wireless client; and activating only one transmit/receive chain and deactivating one or more transmit/receive chains of the multiple transmit/receive chains in response to the access point returning to the first operating mode.

25. The computer readable medium of claim 24 wherein the transitioning the access point from the first operating mode to the second operating mode is controlled by the processor upon receiving a predetermined packet.

26. The computer readable medium of claim 25 wherein the predetermined packet is a Request to Send (RTS) packet indicating transmission of data in accordance with a particular IEEE 802.11 standard.

27. The computer readable medium of claim 24, wherein the one transmit/receive chain of the plurality of transmit/receive chains, activated by the processor in response to the access point returning to the first operating mode, is different from the multiple transmit/receive chains.

28. An access point comprising:

one or more antennas;

a plurality of transmit/receive chains coupled to the one or more antennas, a processor communicatively coupled to the plurality of transmit/receive chains, the processor executing software to control operations of the access point, including (i) activating one transmit/receive chain of the plurality of transmit/receive chains when the access point is in a first operating mode, each of the plurality of transmit/receive chains comprises a receiver and a transmitter associated with a particular frequency band, (ii) analyzing incoming wireless information to determine whether the incoming wireless information is from a first wireless client supporting a first communication scheme or a second wireless client supporting a second communication scheme, (iii) maintaining activation of the one transmit/receive chain if the incoming wireless information is from the first wireless client, (iv) activating multiple transmit/receive chains of the plurality of transmit/receive chains for transmitting or receiving information when the access point is placed in a second operating mode upon determining that the incoming wireless information is from the second wireless client, and (v) activating only one transmit/receive chain and deactivating one or more transmit/receive chains of the multiple transmit/receive chains in response to the access point returning to the first operating mode.

29. The access point of claim 28 wherein the software executed by the processor transitions the access point from the first operating mode to the second operating mode is made upon receiving a predetermined packet.

30. The access point of claim 29 wherein the predetermined packet is a Request to Send (RTS) packet indicating transmission of data in accordance with a particular IEEE 802.11 standard.

31. The access point of claim 28 wherein the software executed by the processor transitions the access point from the first operating mode to the second operating mode to transmit data in the second operating mode.

32. The access point of claim 28 wherein the software executed by the processor activating and deactivating particular transmit/receive chains of the plurality of transmit/receive chains comprises controlling power to portions of the particular transmit/receive chains.

33. The access point of claim 32 wherein the portions of the particular transmit/receive chains to which power is controlled include power amplifiers.

34. The access point of claim 28, wherein the one transmit/receive chain of the plurality of transmit/receive chains activated upon returning the access point from the second operating mode to the first operating mode is different from the multiple transmit/receive chains.

35. The access point of claim 28, wherein the one transmit/receive chain of the plurality of transmit/receive chains activated upon returning the access point from the second operating mode to the first operating mode is part of the multiple transmit/receive chains.

36. The access point of claim 28, wherein the deactivating of one or more transmit/receive chains of the plurality of transmit/receive chains comprises removing power from at least one of an amplifier and a pre-amplifier implemented within the one or more transmit/receive chains.

37. The access point of claim 28, wherein the deactivating of the one or more transmit/receive chains of the plurality of transmit/receive chains comprises removing power from selected circuitry within the one or more transmit/receive chains while maintaining power to circuitry for determining operating frequencies within the one or more transmit/receive chains.

38. The access point of claim 37, wherein the circuitry for determining operating frequencies includes at least one of a synthesizer and a phase locked loop.

39. The access point of claim 38, wherein the selected circuitry includes at least one of a power amplifier and a preamplifier.

40. The access point of claim 28, wherein each of the plurality of transmit/receive chains includes radio transmitter and receiver circuitry.

41. The access point of claim 28, wherein each of the plurality of transmit/receive chains includes a receive radio chain and a transmit radio chain, wherein a corresponding transmit/receive chain of the plurality of transmit/receive chains is activated if one of the receive radio chain and the transmit radio chain is activated.

* * * * *